(12) United States Patent
Harrison et al.

(10) Patent No.: US 9,829,772 B2
(45) Date of Patent: Nov. 28, 2017

(54) REMOVABLE CAMERA MOUNT FOR A HELMET

(71) Applicant: GoPro, Inc., San Mateo, CA (US)

(72) Inventors: Ryan Harrison, Walpole, NH (US); Joshua Todd Druker, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/246,381

(22) Filed: Aug. 24, 2016

(65) Prior Publication Data

US 2017/0059967 A1 Mar. 2, 2017

Related U.S. Application Data

(60) Provisional application No. 62/213,085, filed on Sep. 1, 2015.

(51) Int. Cl.
   *G03B 17/56* (2006.01)
   *A45F 5/02* (2006.01)
   *F16M 13/04* (2006.01)

(52) U.S. Cl.
   CPC ............. *G03B 17/561* (2013.01); *A45F 5/02* (2013.01); *F16M 13/04* (2013.01)

(58) Field of Classification Search
   CPC ......... A45F 5/02; F16M 13/04; A42B 3/0406; A42B 3/042; G02B 23/125; H04N 7/152
   See application file for complete search history.

(56) References Cited

U.S. PATENT DOCUMENTS

| | | | | |
|---|---|---|---|---|
| 5,775,558 | A | * | 7/1998 | Montalbano ............... A45F 3/14 224/605 |
| 9,244,337 | B2 | * | 1/2016 | Weihe ................... G03B 17/561 |
| 2003/0115662 | A1 | * | 6/2003 | Dobbie ................... A42B 3/085 2/422 |
| 2008/0316734 | A1 | * | 12/2008 | Spartano ................. F21L 14/00 362/105 |
| 2013/0306689 | A1 | * | 11/2013 | Johnson .................. A45C 11/00 224/181 |
| 2015/0143618 | A1 | * | 5/2015 | Pereira ..................... A42B 1/24 2/417 |

\* cited by examiner

*Primary Examiner* — Clayton E LaBalle
*Assistant Examiner* — Linda B Smith
(74) *Attorney, Agent, or Firm* — Fenwick & West LLP

(57) ABSTRACT

A camera helmet mount can removably secure a camera to a helmet via three attachment points, each of which may be a vent hole, a portion of a face mask, or an edge of the helmet. The camera helmet mount may include a main base that couples with a portion of a camera mount, a rear strap, two main arms, and two optional extension arms. The rear strap and two main arms may have hooks at their distal ends opposite the main base that are secured to the three attachment points. The rear strap can be looped through a rear strap fastener of the main base and secured to itself via a strap clip. The main arms may be removably secured to the main base and can be lengthened by installing extension arms and attaching the hooks of the main arms to the other end of the extension arms.

20 Claims, 8 Drawing Sheets

REMOVABLE CAMERA MOUNT FOR A HELMET

CROSS-REFERENCE TO RELATED APPLICATIONS

This application claims the benefit of U.S. Provisional Patent Application No. 62/213,085, filed on Sep. 1, 2015, which is hereby incorporated by reference in its entirety.

BACKGROUND

1. Technical Field

This disclosure relates to camera mounts, and more specifically, to a camera mount for a helmet.

2. Description of the Related Art

A variety of different camera mounts are available for mounting cameras to different types of objects. Mounting a camera to a helmet is desirable to capture action shots in sports such as football, hockey, baseball, or other sports in which athletes typically wear helmets. However, mounting a camera to a helmet may be difficult for a variety of reasons, including a lack of helmet features that may attach to conventional mounts without damaging the helmet. Furthermore, permanently mounting a camera to a helmet may be undesirable because the user may not always want to have the camera installed.

SUMMARY

A camera helmet mount can removably secure a camera to a helmet via three attachment points, each of which may be a vent hole, a portion of a face mask, or an edge of the helmet. The camera helmet mount may include a main base, a rear strap, two main arms, and two optional extension arms. The main base has a mounting portion that may couple with a portion of a camera mount, such as a quick-release camera mount, as well as two main arm fasteners for securing the main arms, and a rear strap fastener for securing the rear strap. The rear strap and two main arms may have hooks at their distal ends opposite the main base. The rear hook of the rear strap can be positioned by adjusting the length of the rear strap, which is looped through the rear strap fastener of the main base and secured to itself via a strap clip. The snap hooks of the main arms can be removed and have their placement adjusted by securing them to different holes in a series of holes on the distal end of the main arms. The main arms can be lengthened and further adjusted by securing extension arms to the main arms by coupling button protrusions on one end of the extension arms to the main arms' series of holes, and securing the snap hooks to a series of holes on the other end of the extension arms. The camera helmet mount can be secured to the helmet by placing the hooks at the attachment points and tightening the rear strap to induce a tensile force in the camera helmet mount that prevents the hooks from moving out of place.

FIGURES

DETAILED DESCRIPTION

The figures and the following description relate to preferred embodiments by way of illustration only. It should be noted that from the following discussion, alternative embodiments of the structures disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. Additionally, in some instances with repeated features, a reference number may only be shown on one instance of that feature, but it is understood that it could refer to any or all of the repeated features. The figures depict embodiments of the disclosed system for purposes of illustration only. One skilled in the art will readily recognize from the following description that alternative embodiments of the structures illustrated herein may be employed without departing from the principles described herein.

Example Camera System Configuration

A camera system can include a camera and a camera housing structured to at least partially enclose the camera. The camera can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing can include a lens window structured on the front surface of the camera housing and configured to substantially align with the camera lens, and one or more indicator windows structured on the front surface of the camera housing and configured to substantially align with the camera indicators.

Figure 1:
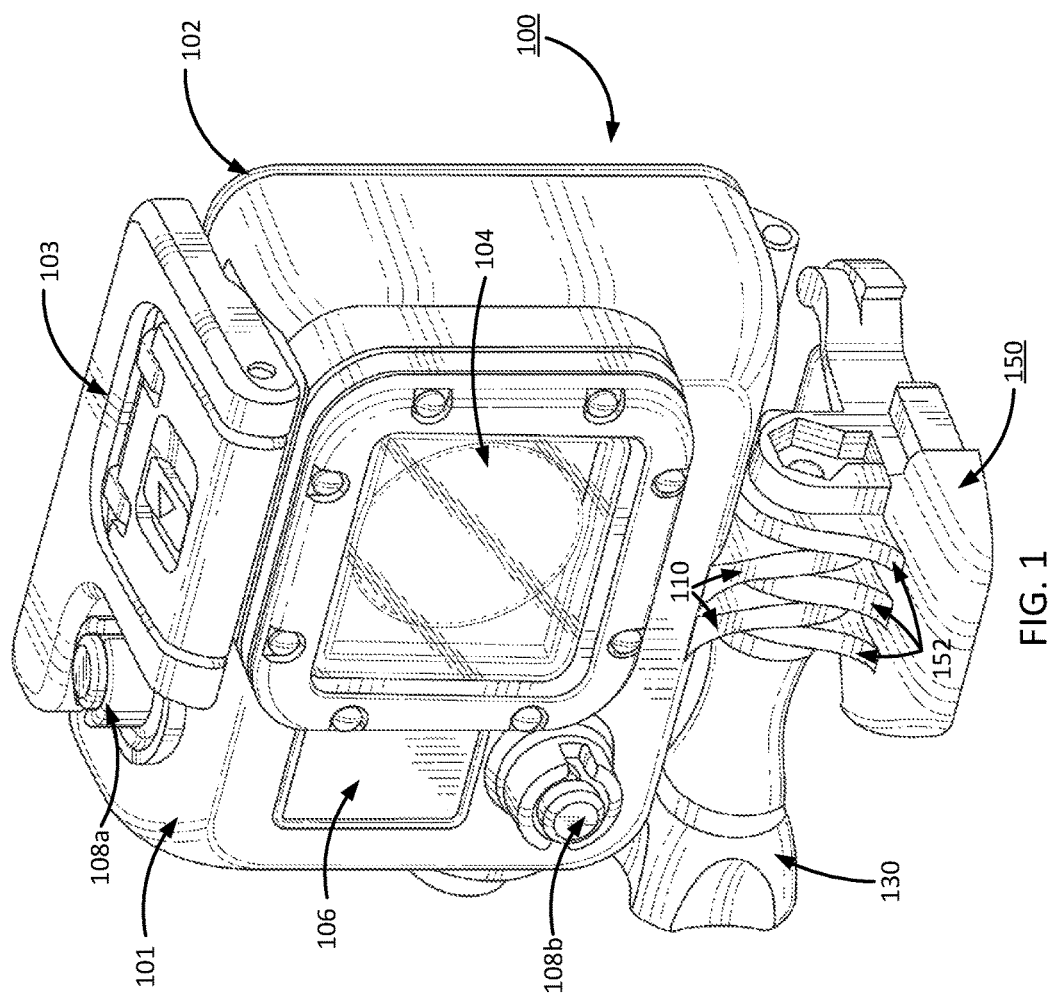
FIG. 1 illustrates a camera housing coupled to a mount, according to one embodiment.

FIG. 1 illustrates a front view of a camera housing 100 and a mount 150, according to one embodiment. In one embodiment, a first housing portion 101 of the camera housing 100 includes a front face with four sides (i.e., a top side, bottom side, left side, and right side) structured to form a cavity that receives a camera (e.g. a still camera or video camera), and a second housing portion 102. The first housing portion 101 and the second housing portion 102 can securely couple via a latch mechanism 103. In some embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

The second housing portion 102 is structured to detachably couple to the first housing portion 101 opposite the front face of the first housing portion 101 and securely enclose a camera within the camera housing 100. In one embodiment, the second housing portion 102 pivots around a hinge mechanism, allowing the second housing portion 102 to be either in a closed position relative to the first housing portion 101 (for instance, when the second housing portion 102 is securely coupled to the first housing portion 101 via the latch mechanism 103), or in an open position (when the first housing portion 101 and the second housing portion 102 are not coupled via the latch mechanism 103). In the open position, a camera can be removed from or placed into the camera housing 100, and in the closed position, the camera can be securely enclosed within the camera housing 100. In one embodiment, the latch mechanism 103 includes a hook-shaped lateral bar configured to securely couple around a reciprocal structure of the second housing portion 102. In different embodiments, the latch mechanism 103 includes different fastening structures for securing the second housing portion 102 to the first housing portion 101, for example a button assembly, a buckle assembly, a clip assembly, a hook and loop assembly, a magnet assembly, a ball and catch assembly, and an adhesive assembly, or any other type of securing mechanism.

In one alternative embodiment, the hinge is instead located on the top face of the housing 100, and the latch mechanism 103 is located on the bottom face of the housing 100. Alternatively, the hinge and the latch mechanism 103 may be located on opposite side faces of the camera housing 100.

In one embodiment, the housing 100 includes a watertight seal so that the housing 100 is waterproof when the second housing portion 102 is in the closed position. For example, in one embodiment, the second housing portion 102 includes a sealing structure positioned on interior edges of the second housing portion 102. The sealing structure provides a watertight seal between the first housing portion 101 and the second housing portion 102 when the latch mechanism 103 securely couples the housing portions.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes one or more outer shutter buttons 108 structured so that one or more shutter buttons of the camera are substantially aligned with the outer shutter buttons 108 when the camera is secured within the camera housing 100. The one or more shutter buttons of the camera are operationally coupled to the outer shutter buttons 108 so that pressing the corresponding outer shutter buttons 108 allows the user to operate the camera shutter buttons.

In one embodiment, the front face of the camera housing 100 includes a lens window 104 structured so that a lens of the camera is substantially aligned with the lens windows 104 when the camera is secured within the camera housing 100. The lens window 104 may be adapted for use with a conventional lens, a wide angle lens, a flat lens, or any other specialized camera lens.

In one embodiment, the camera housing 100 includes an indicator window 106 structured so that one or more camera indicators are substantially aligned with the indicator window 106 when the camera is secured within the camera housing 100. The indicator window 106 may be any shape or size, and may be made of the same material as the remainder of the camera housing 100, or may be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

The camera housing 100 includes a plurality of protrusions 110 (e.g., two) on the bottom surface of the camera housing 100, and the mount 150 includes a plurality of protrusions 152 (e.g., three) on the top surface of the mount 150. In one embodiment, each of the protrusions 110 and the protrusions 152 include a hole of similar diameter such that when the protrusions 110 of the camera housing 100 are inserted into the spaces between the protrusions 152 of the mount 150, the holes may substantially align. When the holes are substantially aligned, the turnable handscrew 130 may be inserted through the holes, thereby coupling the camera housing 100 to the mount 150. The camera housing 100 may pivot around the mount 150 when the turnable handscrew 130 is in a first position (e.g., an untightened position), and may be fixedly coupled to the mount 150 when the turnable handscrew 130 is in a second position (e.g., a tightened position). A pin or any other mechanism configured for coupling the camera housing 100 and the mount 150 may be used in place of the turnable handscrew 130. In other embodiments, the camera housing 100 may be secured to a different type of mounting structure, and may be secured to a mounting structure via a different type of coupling mechanism.

In other embodiments, the mount 150 may couple to a different component other than the camera housing 100 of FIG. 1. In one embodiment, the mount may couple to a camera frame or other camera attachment device configured to securely couple to a camera without necessarily enclosing the camera. For example, the frame may secure around the bottom, top, and side surfaces of a camera, exposing the front and the back surface of the camera. In other embodiments, an a camera attachment device may couple to only a bottom surface of the camera, for instance using an adhesive, a releasable latch, Velcro, or any other securing mechanism.

Figure 2A:
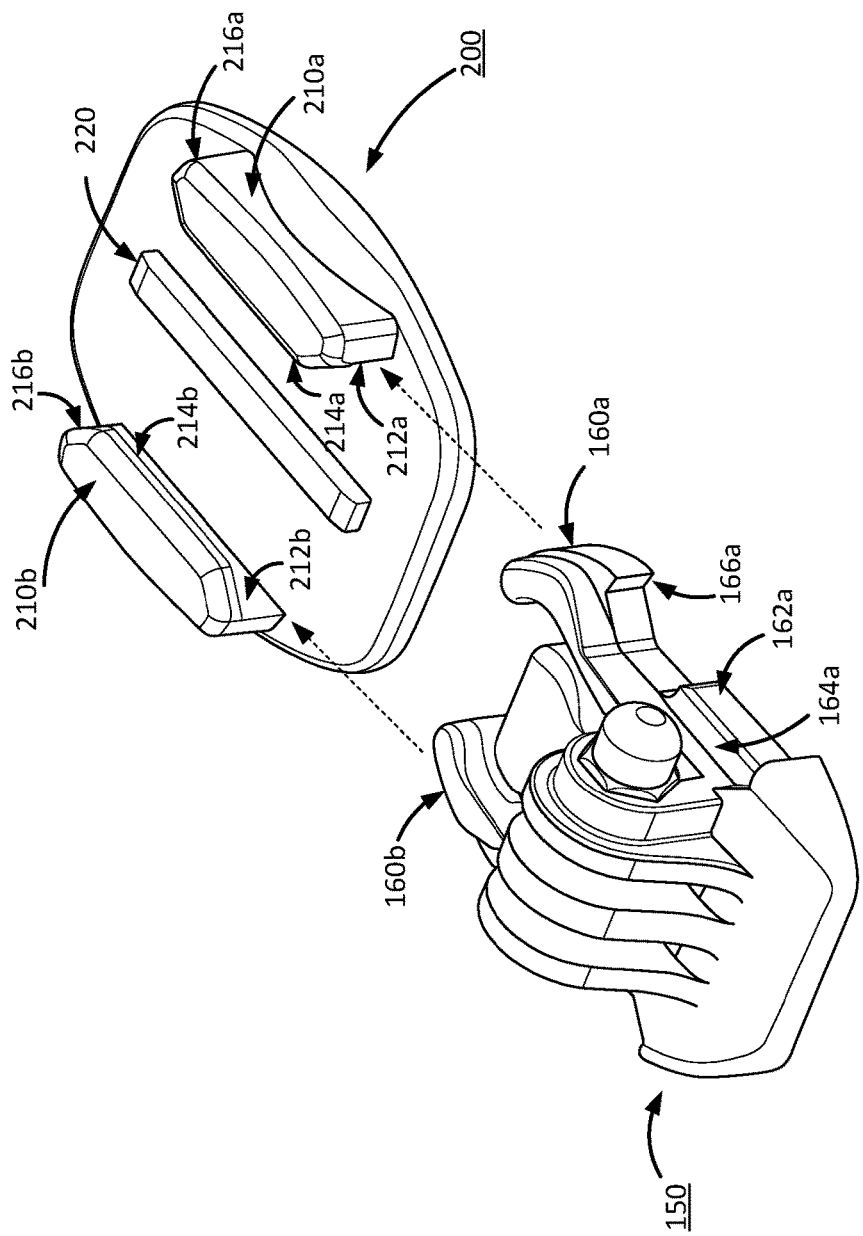
FIGS. 2A and 2B illustrate a mount and a base of a mounting system, according to one embodiment.
Figure 2B:
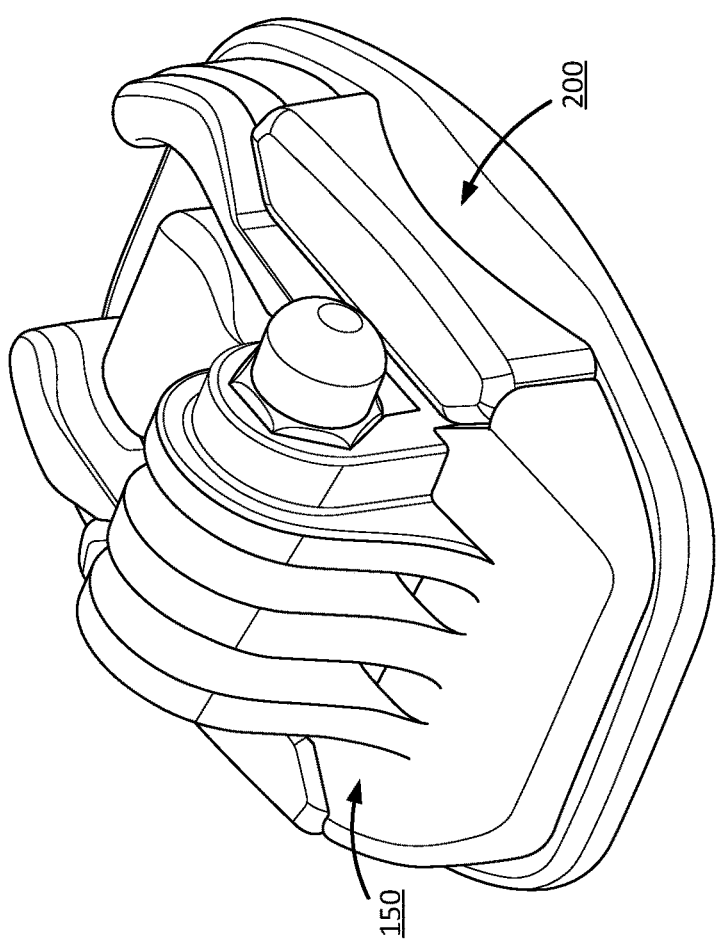

FIGS. 2A and 2B illustrate the mount 150 and a base 200 of the camera mounting system, according to one embodiment. The mount 150 includes two prongs 160a and 160b that may be flexibly compressed inward when squeezed. The prongs 160a and 160b include side securing surfaces 162a and 162b (not shown), top securing surfaces 164a and 164b (not shown), and securing lips 166a and 166b (not shown), respectively. The base 200 includes securing arms 210a and 210b, each with side securing surfaces 212a and 212b, top securing surfaces 214a and 214b, and back securing surfaces 216a and 216b, respectively. The base 200 additionally includes a spine 220 comprising a protrusion along a longitudinal axis of the base 200.

When the prongs 160 of the mount 150 are squeezed together, the width of the prong-side of the mount 150 is reduced to less than the width between the securing arms 210, such that the mount 150 may be slid onto the base 200. When the mount 150 is slid onto the base 200, the side securing surfaces 162a and 162b make contact with and slide along the side securing surfaces 212a and 212b, respectively. Similarly, the top securing surfaces 164a and 164b make contact with and slide along the top securing surfaces 214a and 214b, respectively. When the mount 150 is completely slid into the base 200, the securing arms 210a and 210b decompress outward when the securing lips 166a and 166b are slid past the back securing surfaces 216a and 216b. The securing arms 210a and 210b flexibly exert force outward such that the securing lips 166 extend outwards and make contact with the back securing surfaces 216a and 216b or overlap at least partially with the back securing surfaces 216a and 216b, preventing the mount 150 from sliding backwards and securely coupling the mount 150 to the base 200 as illustrated in FIG. 2B. The mount 150 may be uncoupled from the base 200 by compressing the prongs 160a and 160b of the mount 150 component such that the width of the prong-side of the mount 150 is again reduced to less than the width between the securing arms 210a and 210b of the base 200, and sliding the mount 150 backwards past the base 200.

The mount 150 may include a spine groove on the bottom side of the mount 150 to allow for the reciprocal sliding and insertion of the spine 220 of the base 200 into the spine groove when the mount 150 is slid onto and secured to the base 200.

In alternative embodiments, the mount 150 is configured to securely couple to the base 200 using other means than those described with regards to FIGS. 2A and 2B. For example, the mount 150 may include a securing protrusion on the bottom side of the mount 150 configured for insertion into a reciprocal opening within the base 200, and secured using, for example, a securing pin or other locking mechanism. Similarly, the securing arms 210a and 210b of the base 200 may be compressible or flexible such that the arms may be squeezed apart, the mount 150 may be slid onto the base 200, and the arms may be released, securely coupling the mount 150 to the base 200. The mount 150 may be securely coupled to the base 200 using adhesives, buttons, ties, latches, springs, or any combination of the mechanisms described herein. Any other suitable securing mechanism may be used to secure the mount 150 to the base 200. In one embodiment, the mount 150 and the base 200 are structured to enable detachment of the mount 150 in response to a force of sufficient magnitude. Such a feature may be beneficial to help avoid damage or injury in the case of a sufficiently strong impact.

Example Camera Helmet Mount

Figure 3:
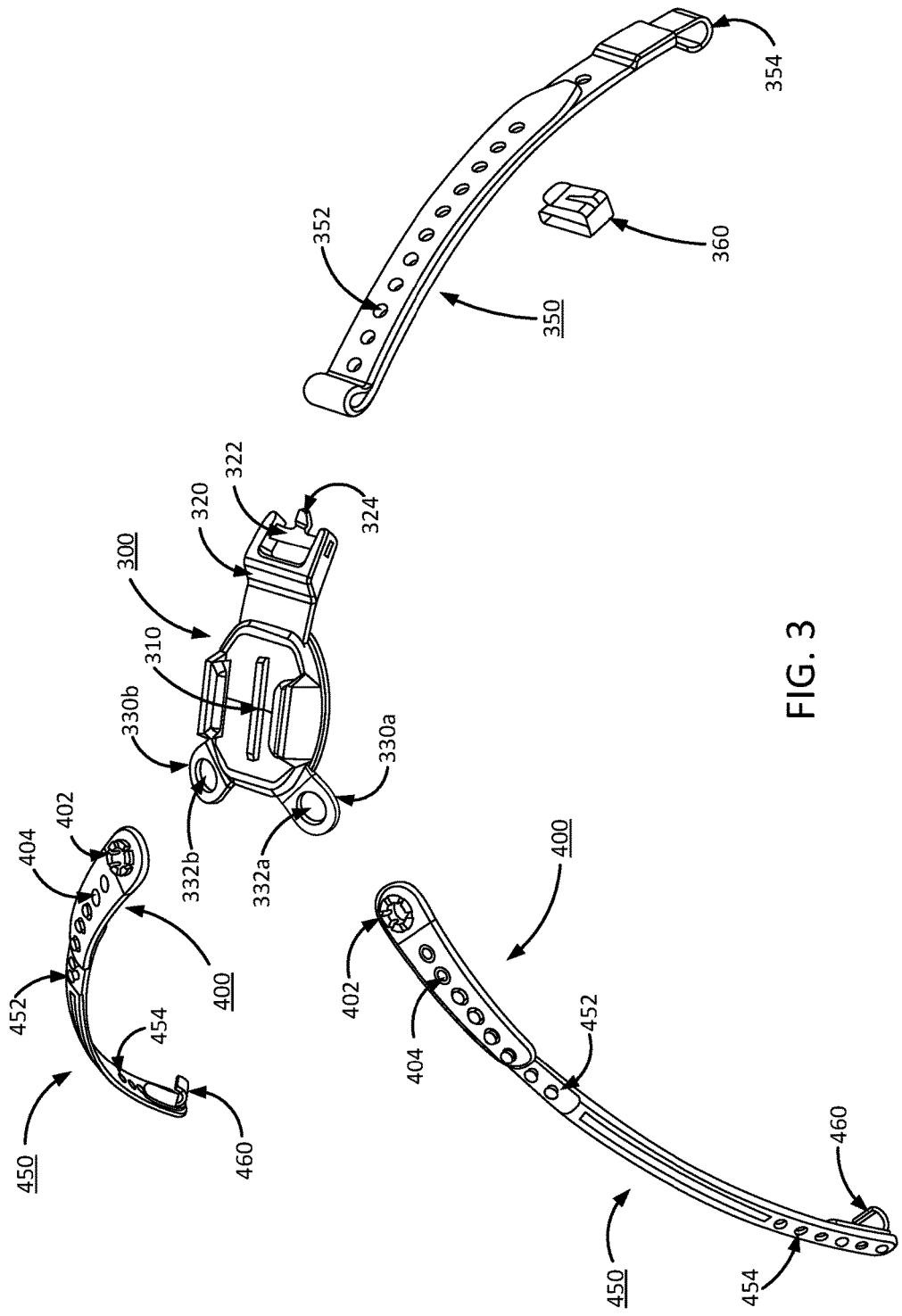
FIG. 3 illustrates an exploded view of a camera helmet mount with extension arms, according to one embodiment.
Figure 4A:
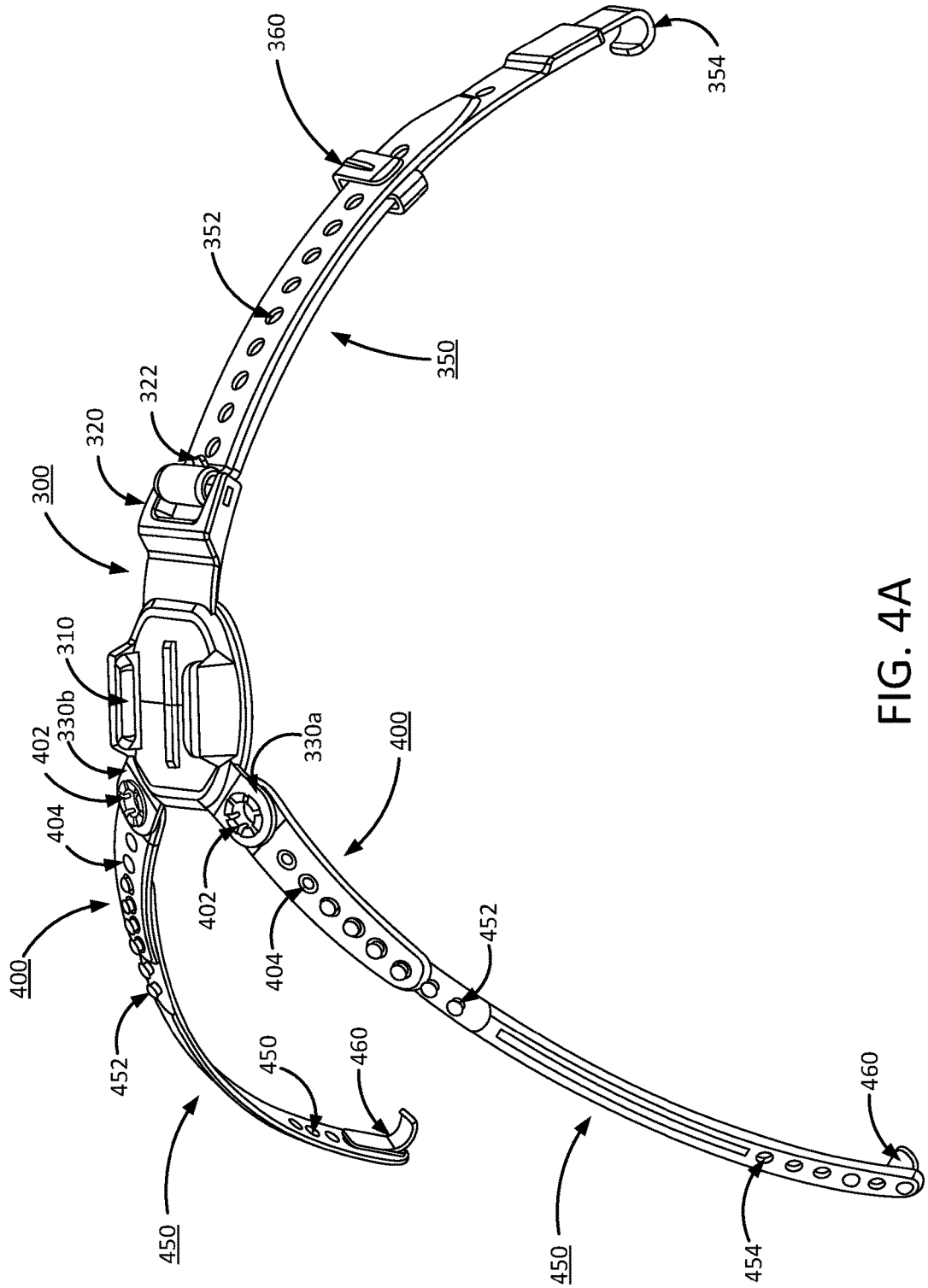
FIGS. 4A and 4B illustrate two perspectives of a camera helmet mount with extension arms attached, according to one embodiment.
Figure 4B:
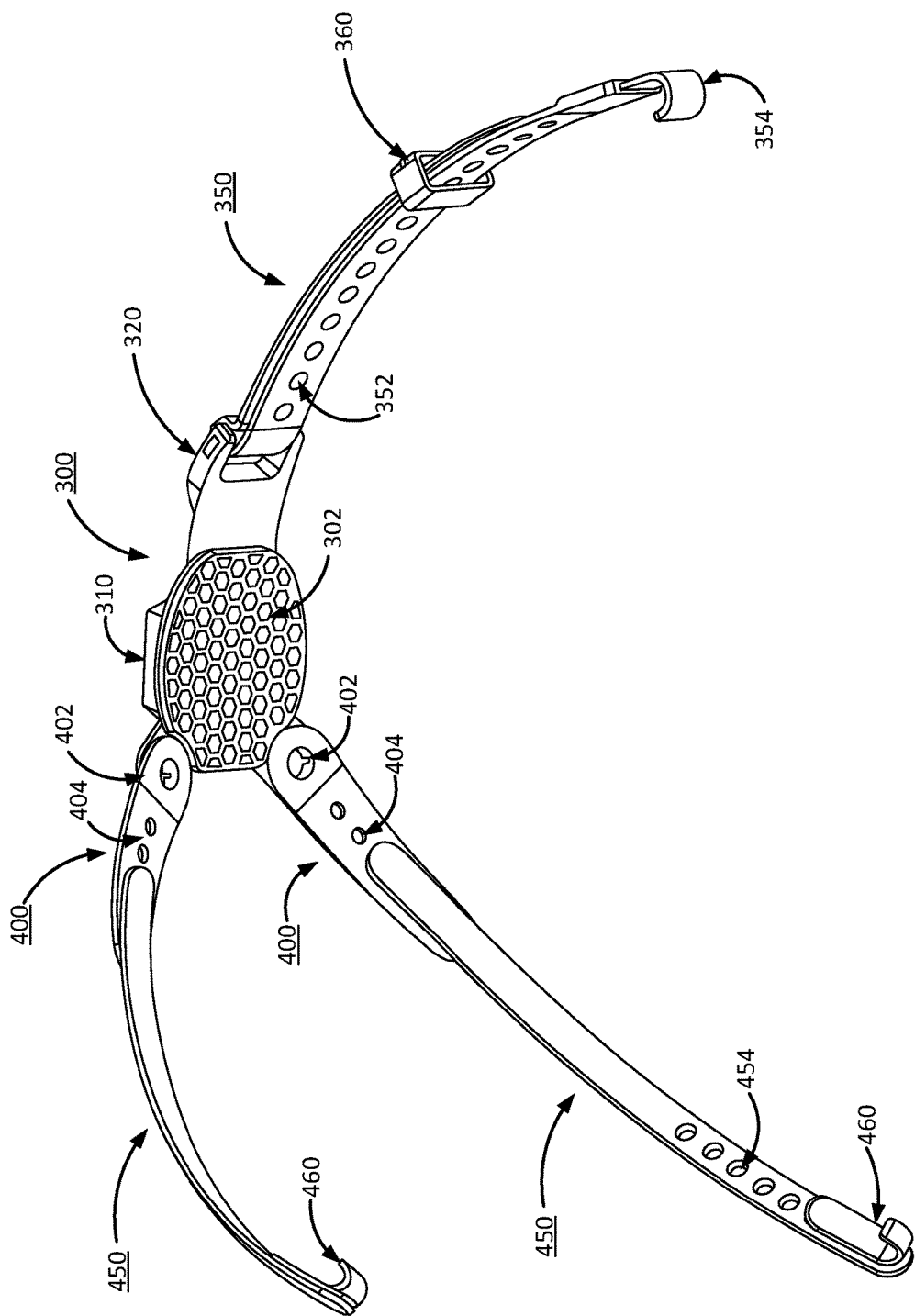

FIG. 3 illustrates a partially-exploded view of a camera helmet mount, according to one embodiment. FIGS. 4A and 4B further illustrate two perspectives of the assembled camera helmet mount. The camera helmet mount may comprise a main base 300, a rear strap 350, one or more main arms 400, and one or more optional extension arms 450. The rear strap 350 and the main arms 400 may be removably connected to the main base 300. The optional extension arms 450 may also be removably connected to the main arms 400.

The main base 300 may comprise a mounting portion 310, one or more main arm fasteners 330 (e.g., a first main arm fastener 330a and a second main arm fastener 330b), and a rear strap fastener 320. The mounting portion 310 may secure a camera to the main base 300. In one embodiment, the mounting portion 310 is substantially similar to base 200 described above and couples to mount 150, both described in FIGS. 1-2B. In another embodiment, the mounting portion 310 includes a plurality of protrusions similar to those of the mount 150 that allow the main base 300 to couple with the camera housing 100 described in FIG. 1 or a different camera attachment device.

In one embodiment, a back surface 302 of the main base 300 comprises a non-skid surface so as to create friction between the main base 300 and the helmet, thereby reducing movement of the main base with respect to a surface of the helmet. Optionally, the back surface 302 of the main base 300 includes a compressible material (such as foam) to allow the main base 300 to sit securely on a helmet that is not necessarily flat.

The rear strap fastener 320 may secure the rear strap 350 to the main base 300. The rear strap 350 may extend outward from the mounting portion 310 along a central axis of the main base 300 and may be structured such that the rear strap 350 can be looped through it. In one embodiment, the rear strap fastener 320 comprises a bar 322 that the rear strap 350 is looped over (or under). The bar 322 may further include a prong 324 extending upward and outward (or alternatively, downward) from the rear strap fastener 320.

The rear strap 350 may comprise a series of holes 352 at different positions along the length of the rear strap 350, a rear hook 354, and a strap clip 360. The rear strap 350 can be looped through the rear strap fastener 320 around the bar 322 so that the rear strap 350 fold over on itself. The prong 324 may couple with a hole 352 of the rear strap 350 to secure the rear strap 350 to the rear strap fastener 320. Specifically, the prong 324 of the rear strap fastener 320 can be secured through a hole 352 of the rear strap 350 that is selected according to a desired overall length of the rear strap 350. The rear strap 350 may additionally include a rear hook 354 that can be hooked onto a portion of a helmet as described in further detail with respect to FIGS. 5-6. In one embodiment, the rear hook 354 is permanently attached to the rear strap 350. In another embodiment, the rear hook 354 is removably attached to the rear strap 350, e.g., such as through a "snap" mechanism.

In some embodiments, the rear strap 350 further includes a strap clip 360 that secures a loose end of the rear strap 350 to another portion of the rear strap 350. The strap clip 360 may secure these portions of the rear strap 350 by asserting an inward pressure onto the portions of the rear strap 350, such that the loose end of the rear strap 350 is prevented from moving. The strap clip 360 may include a protrusion on its inner surface that goes through a hole 352 of the loose end of the rear strap 350 and a hole 352 of the other portion of the rear strap 350 to secure the rear strap 350. In an alternative embodiment, the rear strap fastener 320 may lack the prong 324 because the strap clip 360 is sufficient to secure the rear strap 350 at a desired length secure it to the main base 300. In one embodiment, the rear strap 350 does not include any holes 352 and instead relies solely on the force induced by the strap clip 360.

In another embodiment, the rear strap fastener 320 further comprises a frame that extends outward further than the prong 324, giving the rear strap fastener 320 a structure similar to a belt buckle. The frame applies downward pressure onto a loose end of the rear strap 350 when the camera helmet mount is installed to prevent the rear strap 350 from moving.

The main arm fasteners 330 may secure the main arms 400 to the main base 300. The main arm fasteners 330 can be any sort of securing mechanism that mates with a reciprocal fastening mechanism 402 of the main arms 400. In one embodiment, each main arm fastener 330 is a female button fastener portion that includes a through hole 332 (for example a first through hole 332a corresponding to the first main arm fastener 330a and a second through hole 332b corresponding to the second main arm fastener 330b).

In some embodiments, the main base 300 comprises two main arm fasteners 330a and 330b. Both main arm fasteners 330a and 330b extend from a half of the mounting portion 310 opposite the rear strap fastener 320. Each main arm fastener 330 may be located between approximately 45 degrees and approximately 60 degrees off of the central axis of the main base 300, inclusive.

Each main arm 400 may comprise a reciprocal fastening mechanism 402, and a series of holes 404. The reciprocal fastening mechanism 402 may couple with one of the main arm fasteners 330 of the main base 300 to removeably secure the main arm 400 to the main base 300. In one embodiment, the reciprocal fastening mechanism 402 is a male button fastening portion. The male button fastener portion extends from a top surface of the main arm 400 and is shaped such that it can fit through the hole 332 of the main base 300's female button fastener portion. The male button fastener portion then further includes a rim that has a wider radius than the hole 332 and is compressible such that it can fit through the hole 332 when compressed and stay secured when not compressed. In one embodiment, the main arms 400 are rotatable around the main arm fastener 330 and the reciprocal fastening mechanism 402 with respect to the main base 300. The series of holes 404 can be positioned along some or all of the length of the main arm 400. The holes 404 can optionally couple with either the extension arms 450 or directly with the snap hooks 460 (both described below).

Each extension arm 450 may comprise a series of button protrusions 452 on a first end, and a series of holes 454 on a second end. One or more of the series of button protrusions 452 may couple with the one or more of the series of holes 404 of the main arms 400. Specifically, one or more of the button protrusions 452 can be secured in one or more of the holes 404 to secure the extension arm 450 to the main arm 400. The number of buttons protrusions 452 secured in the holes 404 can be adjusted to adjust the overall length of the main arm 400 coupled to the extension arm 450. That is, the amount of overlap between the main arm 400 and extension arm 450 can be changed to adjust their combined length. The holes 454 may couple with a reciprocal button on the snap hooks 460 (described below), which may be positioned according to the desired length.

Figure 5:
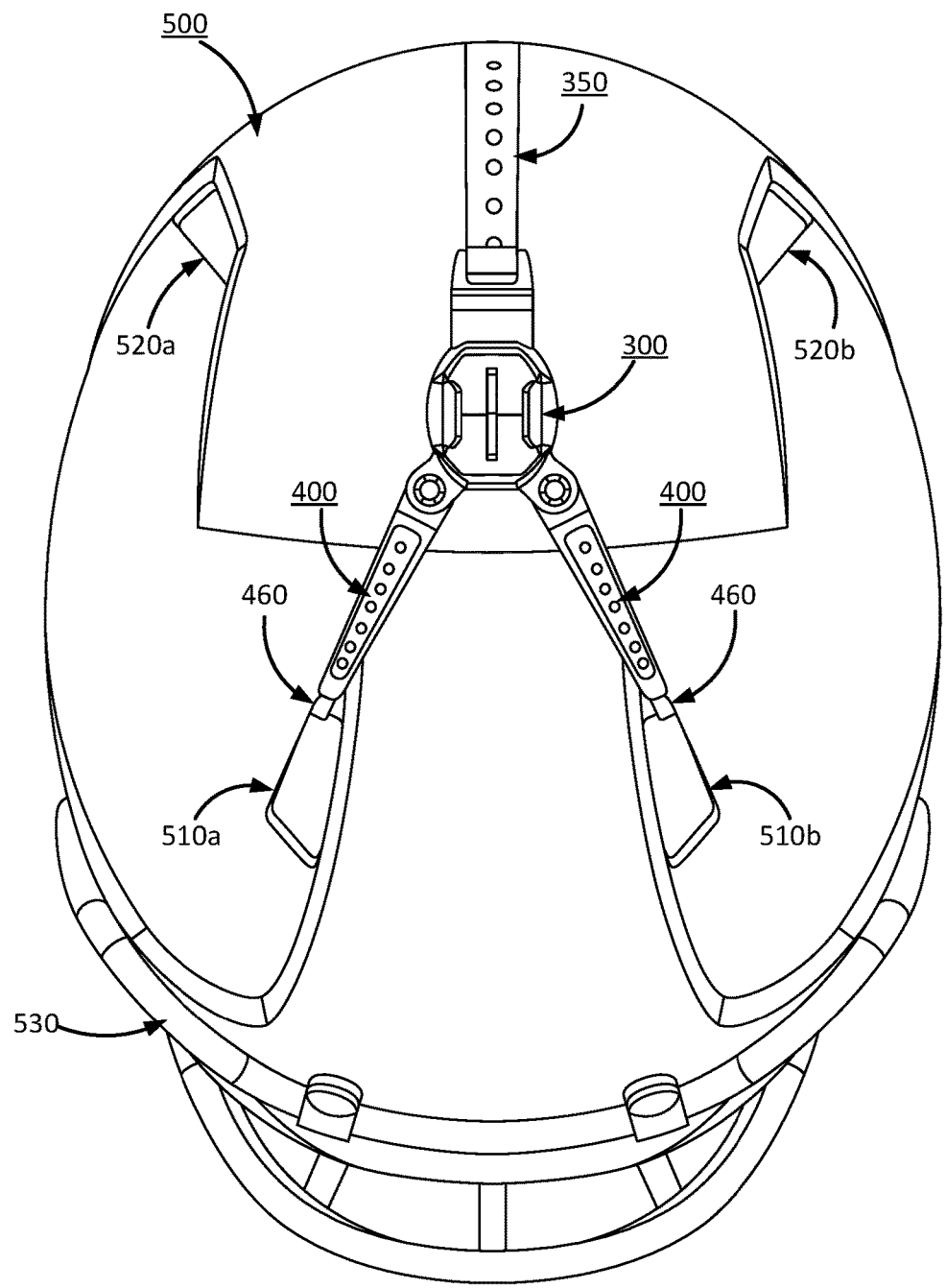
FIG. 5 illustrates a camera helmet mount secured to a helmet, according to one embodiment.
Figure 6:
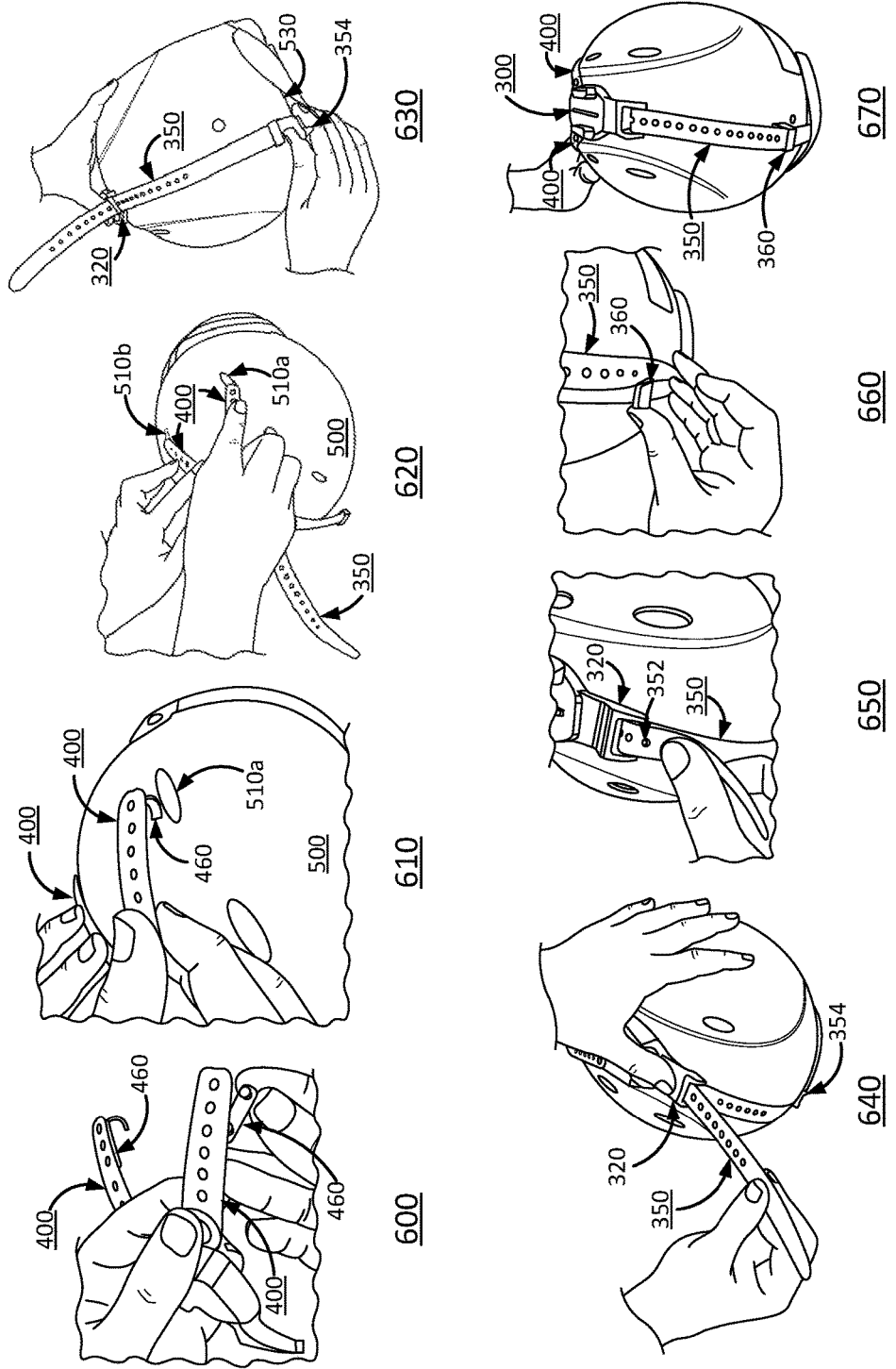
FIG. 6 illustrates a method for installing a camera helmet mount, according to one embodiment.

The snap hooks 460 (shown attached to extension arms 450) are hooked onto portions of a helmet as described in further detail with respect to FIGS. 5-6. The snap hooks 460 may be attached to the extension arms 450 as shown or directly to the main arms 400 depending of the total strap lengths desired to secure the camera helmet mount to the helmet. In one embodiment, each snap hook 460 has one or more button protrusions that are removably secured in the holes 404 of the main arms 400 or the holes 454 of the extension arms 450. This coupling mechanism combined with the series of holes 404 of the main arms 400 and the series of holes 454 of the extension arms enable the effective total length of the main arm 400 (and extension arm 450, if applicable) to be further adjusted by securing the snap hooks 460 in various holes. In another embodiment, the snap hooks 460 are permanently attached to the main arms 400 or the extension arms 450.

The main arms 400 and extension arms 450 may comprise a rigid or semi-rigid material. In one embodiment, the rear strap 350 comprises a stretchable material and the rigid or semi-rigid material used for the main arms 400 and extension arms 450 is less stretchable than the rear strap 350. In some embodiment, the rear strap 350 and main arms 400 are made of an easily washable material such as plastic or rubber. In another embodiment, one or more of the main base 300 and main arms 400 comprise a stretchable material in lieu of, or in addition to, the rear strap 350 comprising a stretchable material.

FIG. 5 illustrates the camera helmet mount secured to a helmet 500, according to one embodiment. The camera helmet mount may be secured to the helmet 500 by putting snap hooks 460 through vent holes 510a and 510b of the helmet 500 and placing rear hook 354 over the back edge (not shown) of the helmet 500. After the snap hooks 460 and the rear hook 354 are in place, the rear strap 350 can be tightened to induce a tensile force in the rear strap 350 and main arms 400 of the camera helmet mount that prevents the hooks 460 and 354 from moving out of place or getting dislodged.

Alternatively, for different configurations of the helmet camera mount, the snap hooks 460 or rear hook 354 could variously be secured to other vent holes 520, to a bar 530 of a face mask of the helmet 500, or to other edges of the helmet 500. Furthermore, the helmet camera mount can be secured to a variety of different helmets having different form factors and different vent hole locations, as well as in multiple configurations including, but not limited to, a side-mounted configuration, a top-mounted configuration, and a front-mounted configuration.

FIG. 6 illustrates the camera helmet mount without extension arms 450 being attached to the helmet 500, according to one embodiment. Image 600 shows snap hooks 460 being attached to the main arms 400 (that have already been attached to the main base 300) by inserting two button protrusions of the snap hooks 460 into two holes 404 of the main arms at a desired position. Images 610 and 620 show the snap hooks 460 being hooked onto separate vent holes 510a and 510b. Image 630 shows the rear hook 354 of the rear strap 350 being hooked over a back edge 540 of the helmet 500. Additionally, the rear strap 350 is threaded through the rear strap fastener 320 around the bar 322 and folded over onto itself. Image 640 shows a loose end of the rear strap 350 being stretched in order to tighten the rear strap 350 and induce a tensile force in the rear strap 350 and main arms 400. Image 650 shows a hole 352 of the rear strap 350 being secured through a prong 324 of the rear strap fastener 320. Image 660 further shows a loose end of the rear strap 350 being attached to another portion of the rear strap 350 via a strap clip 360. Image 670 shows the camera helmet mount fully secured to the helmet 500.

Additional Configuration Considerations

It is noted that some embodiments described herein have used the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera mount comprising:
    a main base having a top surface structured as a first portion of a camera mount for attaching to a camera, the main base comprising a rear portion having rear strap fastener and a front portion having a first female button fastener portion and a second button female fastener portion, the rear strap fastener comprising a bar and a prong protruding from the bar;
    a rear strap having a series of holes, the rear strap looped around the bar of the rear strap fastener and secured to itself via the prong of the rear strap fastener through one of the series of holes proximate to the rear strap fastener, the rear strap further comprising a rear hook at a distal end of the rear strap opposite the rear strap fastener, the rear hook for securing to a first attachment point of a helmet;
    a strap clip holding a loose end of the rear strap to another portion of the rear strap;
    a first main arm having a first male button fastener portion at a first end secured to the first female button fastener portion of the main base, the first main arm further comprising a first series of holes;
    a second main arm having a second male button fastener portion at a first end secured to the second female button fastener portion of the main base, the second main arm further comprising a second series of holes;
    a first extension arm having a first series of button protrusions at a first end at least one of which to removably secure to at least one of the first series of holes of the first main arm, and the first removable extension arm having a third series of holes at a second end;
    a second extension arm having a second series of button protrusions at a first end at least one of which to removably secure to at least one of the second series of holes of the second main arm, and the second extension arm having a fourth series of holes at a second end;
    a first snap hook comprising a button protrusion secured to one of the first series of holes of the first extension arm, and the first snap hook comprising a first hook to secure to a second attachment point of the helmet; and
    a second snap hook comprising a button protrusion secured to one of the second series of holes of the second extension arm, and the second snap hook comprising a second hook to secure to a third attachment point of the helmet.

2. The camera mount of claim 1, wherein the first main arm is rotatable about the first female button fastener portion and the second main arm is rotatable about the second female button fastener portion.

3. The camera mount of claim 1, wherein one or more of the first attachment point, the second attachment point, and the third attachment point is structured to attach to a vent hole of the helmet.

4. The camera mount of claim 1, wherein the first female button fastener portion and the second female button fastener portion positioned between 45 and 60 degrees, inclusive, off of a central axis of the main base.

5. The camera mount of claim 1, wherein a bottom surface of the main base potion opposite the top surface of the main base comprises a substantially non-skid surface.

6. The camera mount of claim 1, wherein a bottom surface of the main base potion opposite the top surface of the main base comprises a compressible foam.

7. The camera mount of claim 1, wherein the rear strap comprises a stretchable material.

8. The camera mount of claim 1, wherein one or more of the first main arm, the second main arm, the first removable extension arm, and the second removable extension arm comprise a rigid material.

9. A camera system comprising:
    a camera; and
    a camera mount securing the camera, the camera mount comprising:
    a main base having a top surface structured as a first portion of a camera mount for attaching to the camera, the main base comprising a rear portion having rear strap fastener and a front portion having a first female button fastener portion and a second button female fastener portion, the rear strap fastener comprising a bar and a prong protruding from the bar;
    a rear strap having a series of holes, the rear strap looped around the bar of the rear strap fastener and secured to itself via the prong of the rear strap fastener through one of the series of holes proximate to the rear strap fastener, the rear strap further comprising a rear hook at a distal end of the rear strap opposite the rear strap fastener, the rear hook for securing to a first attachment point of a helmet;
    a strap clip holding a loose end of the rear strap to another portion of the rear strap;

a first main arm having a first male button fastener portion at a first end secured to the first female button fastener portion of the main base, the first main arm further comprising a first series of holes;

a second main arm having a second male button fastener portion at a first end secured to the second female button fastener portion of the main base, the second main arm further comprising a second series of holes;

a first extension arm having a first series of button protrusions at a first end at least one of which to removably secure to at least one of the first series of holes of the first main arm, and the first removable extension arm having a third series of holes at a second end;

a second extension arm having a second series of button protrusions at a first end at least one of which to removably secure to at least one of the second series of holes of the second main arm, and the second extension arm having a fourth series of holes at a second end;

a first snap hook comprising a button protrusion secured to one of the first series of holes of the first extension arm, and the first snap hook comprising a first hook to secure to a second attachment point of the helmet; and a second snap hook comprising a button protrusion secured to one of the second series of holes of the second extension arm, and the second snap hook comprising a second hook to secure to a third attachment point of the helmet.

10. The camera system of claim 9, wherein the first main arm is rotatable about the first female button fastener portion and the second main arm is rotatable about the second female button fastener portion.

11. The camera system of claim 9, wherein one or more of the first attachment point, the second attachment point, and the third attachment point is structured to attach to a vent hole of the helmet.

12. The camera system of claim 9, wherein the first female button fastener portion and the second female button fastener portion positioned between 45 and 60 degrees, inclusive, off of a central axis of the main base.

13. The camera system of claim 9, wherein a bottom surface of the main base potion opposite the top surface of the main base comprises a substantially non-skid surface.

14. The camera system of claim 9, wherein a bottom surface of the main base potion opposite the top surface of the main base comprises a compressible foam.

15. The camera system of claim 9, wherein the rear strap comprises a stretchable material.

16. The camera system of claim 9, wherein one or more of the first main arm, the second main arm, the first removable extension arm, and the second removable extension arm comprise a rigid material.

17. A camera system comprising:
a camera;
a helmet; and
a camera mount securing the camera to the helmet, the camera mount comprising:
a main base having a top surface structured as a first portion of a camera mount for attaching to the camera, the main base comprising a rear portion having rear strap fastener and a front portion having a first female button fastener portion and a second button female fastener portion, the rear strap fastener comprising a bar and a prong protruding from the bar;

a rear strap having a series of holes, the rear strap looped around the bar of the rear strap fastener and secured to itself via the prong of the rear strap fastener through one of the series of holes proximate to the rear strap fastener, the rear strap further comprising a rear hook at a distal end of the rear strap opposite the rear strap fastener, the rear hook for securing to a first attachment point of the helmet;

a strap clip holding a loose end of the rear strap to another portion of the rear strap;

a first main arm having a first male button fastener portion at a first end secured to the first female button fastener portion of the main base, the first main arm further comprising a first series of holes;

a second main arm having a second male button fastener portion at a first end secured to the second female button fastener portion of the main base, the second main arm further comprising a second series of holes;

a first extension arm having a first series of button protrusions at a first end at least one of which to removably secure to at least one of the first series of holes of the first main arm, and the first removable extension arm having a third series of holes at a second end;

a second extension arm having a second series of button protrusions at a first end at least one of which to removably secure to at least one of the second series of holes of the second main arm, and the second extension arm having a fourth series of holes at a second end;

a first snap hook comprising a button protrusion secured to one of the first series of holes of the first extension arm, and the first snap hook comprising a first hook to secure to a second attachment point of the helmet; and a second snap hook comprising a button protrusion secured to one of the second series of holes of the second extension arm, and the second snap hook comprising a second hook to secure to a third attachment point of the helmet.

18. The camera system of claim 17, wherein the first main arm is rotatable about the first female button fastener portion and the second main arm is rotatable about the second female button fastener portion.

19. The camera system of claim 17, wherein one or more of the first attachment point, the second attachment point, and the third attachment point is structured to attach to a vent hole of the helmet.

20. The camera system of claim 17, wherein a bottom surface of the main base potion opposite the top surface of the main base comprises a compressible foam.

* * * * *